(12) United States Patent
Suzuki

(10) Patent No.: US 10,306,150 B2
(45) Date of Patent: May 28, 2019

(54) ELECTRONIC APPARATUS THAT DISPLAYS IMAGE SUITABLE FOR OPENED/CLOSED STATE AND ROTATED STATE OF DISPLAY UNIT

(71) Applicant: CANON KABUSHIKI KAISHA, Tokyo (JP)

(72) Inventor: Yuto Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/874,076

(22) Filed: Jan. 18, 2018

(65) Prior Publication Data
US 2018/0213157 A1    Jul. 26, 2018

(30) Foreign Application Priority Data

Jan. 20, 2017   (JP) .................................. 2017-008580

(51) Int. Cl.
*H04N 5/232*   (2006.01)
*H04N 5/225*   (2006.01)
*G03B 17/02*   (2006.01)

(52) U.S. Cl.
CPC ......... *H04N 5/23293* (2013.01); *G03B 17/02* (2013.01); *H04N 5/2251* (2013.01); *H04N 5/225251* (2018.08)

(58) Field of Classification Search
CPC .................................................. H04N 5/23293
USPC ........................................ 348/333.01, 333.06
See application file for complete search history.

(56) References Cited

U.S. PATENT DOCUMENTS

2009/0295975 A1* 12/2009 Takahashi .......... H04N 5/23293
                                                  348/333.01
2013/0050557 A1*  2/2013 Moriyasu ............. H04N 5/2251
                                                  348/333.06

FOREIGN PATENT DOCUMENTS

JP    2012-042743 A    3/2012
JP    2016-138950 A    8/2016

OTHER PUBLICATIONS

The above foreign patent document was cited in the Aug. 7, 2018 Japanese Office Action, which is without an enclosed English Translation, that issued in Japanese Patent Application No. 2017008580.

* cited by examiner

*Primary Examiner* — Anthony J Daniels
(74) *Attorney, Agent, or Firm* — Cowan, Liebowitz & Latman, P.C.

(57) ABSTRACT

An electronic apparatus which independently detects opening/closing and rotation of a display unit, and displays an image suitable for an opened/closed and rotated state of the display unit. The opening/closing sensor, the rotation sensor, and a magnet are arranged so that: when the display unit is closed with respect to an apparatus main body with the display panel facing a rear of the apparatus main body, both sensors detect a positive magnetic field; when the display unit is opened, an opening/closing detection result is switched not to detect the magnetic field in a range of an opening/closing angle from 90° to 175°, and the rotation sensor detects the magnetic field; and when the display unit is rotated, the opening/closing sensor does not detect the magnetic field, and a rotation detection result is switched to detect the magnetic field in a range of a rotating angle from 90° to 180°.

8 Claims, 8 Drawing Sheets

ELECTRONIC APPARATUS THAT DISPLAYS IMAGE SUITABLE FOR OPENED/CLOSED STATE AND ROTATED STATE OF DISPLAY UNIT

BACKGROUND OF THE INVENTION

Field of the Invention

The present invention relates to an electronic apparatus that includes an image pickup apparatus such as a digital camera or a digital video camera, and in particular to an electronic apparatus equipped with a movable display unit.

Description of the Related Art

Some electronic apparatuses such as digital cameras have a display unit that is able to open and close with respect to an apparatus main body and rotatable in an opened state. In such electronic apparatuses, an image displayed on a display panel of the display unit is vertically/horizontally inverted, and the light is turned on/off according to an opened/closed state and a rotated state of the display unit. A magnet, a magnetic sensor, or the like is used to detect the opened or closed state and the rotated state of the display unit for the following reasons, for example: space is saved, and reliability is increased due to non-contacting. For example, Japanese Laid-Open Patent Publication (Kokai) No. 2016-138950 discloses a technique that uses magnetic sensors, which detect a magnetic field of a magnet, to detect the opened or closed state and the rotated state of the display unit, and switches display states of the display panel based on detection signals from the magnetic sensors.

According to Japanese Laid-Open Patent Publication (Kokai) No. 2016-138950 mentioned above, both the magnetic sensor for detecting opening and closing of the display unit and the magnetic sensor for detecting rotation of the display unit detect a magnetic flux density from the same magnet. For this reason, detecting opening and closing of the display unit and detecting rotation of the display unit in a completely separate manner is difficult.

According to Japanese Laid-Open Patent Publication (Kokai) No. 2016-138950, as shown in Table 1, results of detection by the magnetic sensor for detecting opening and closing (opening/closing sensor) of the display unit and the magnetic sensor for detecting rotation (rotation sensor) of the display unit are associated with display control over a display panel (display surface) of the display unit. For this reason, depending on results of detection by the two magnetic sensors, the two magnetic sensors may be affected by a magnetic field, and an image that is not suitable for the opened or closed/rotated state of the display unit may be displayed on the display panel.

TABLE 1

| Modes of display on the display panel | Normal image | Horizontally inverted image | Vertically and horizontally inverted image | Light. turned-off |
|---|---|---|---|---|
| Detection by the opening/closing sensor | OFF | ON | OFF | OFF |
| Detection by the rotation sensor | OFF | ON | ON | OFF |

A detailed description will be given with reference to FIG. 10. FIG. 10 is a graph showing a relationship between rotating actions of the conventional display unit described in Japanese Laid-Open Patent Publication (Kokai) No. 2016-138950 and magnetic flux densities detected by the opening/closing sensor and the rotation sensor.

As shown in FIG. 10, a detection signal from the opening/closing sensor outputs OFF when the magnetic flux density becomes greater than a threshold value, and a detection signal from the opening/closing sensor outputs is ON when the magnetic flux density is equal to or smaller than the threshold value. A detection signal from the rotation sensor outputs is on when the magnetic flux density becomes greater than a threshold value, and a detection signal from the rotation sensor outputs is off when the magnetic flux density is equal to or smaller than the threshold value. Referring to FIG. 10, detection results vary as follows: "both the opening/closing sensor and the rotation sensor are off" when the rotational angle of the display unit is between 0° and 160°, "only the rotation sensor is on" when the rotational angle of the display unit is about 160°, and "both the opening/closing sensor and the rotation sensor are on" when the rotational angle of the display unit is about 170°. In this case, referring to Table 1, as the display unit is rotated from 0° to 180° in the opened state, images displayed on the display panel are switched in the following order, a normal image→a vertically and horizontally inverted image→a vertically inverted image.

According to Japanese Laid-Open Patent Publication (Kokai) No. 2016-138950, however, vertical and horizontal inversion of an image to be displayed occurs as a result of an opening/closing action of the display unit, and it is preferred that the display on the display panel during a rotating action is switched from a normal image to a vertically inverted image without a vertically and horizontally inverted image being displayed after the normal image is displayed.

SUMMARY OF THE INVENTION

The present invention provides an electronic apparatus which makes it possible to detect opening/closing of a display unit and detect rotation of the display unit in a completely separate manner, and display, on a display panel, an image suitable for an opened/closed state and a rotated state of the display unit movable with respect to an apparatus main body.

Accordingly, the present invention provides an electronic apparatus in which a display unit is able to open and close with respect to an apparatus main body via an opening/closing axis and is supported in a manner being rotatable about a rotational axis in an opened state, comprising a magnetic field generating unit; an opening/closing detecting unit configured to be used to detect opening and closing of the display unit; a rotation detecting unit configured to detect rotation of the display unit; and a control unit configured to control display on a display panel of the display unit based on results of detection of a magnetic field, which is generated by the magnetic field generating unit, by the opening/closing detecting unit and the rotation detecting unit, wherein the opening/closing detecting unit, the rotation detecting unit, and the magnetic field generating unit are arranged so that: when the display unit is at a closed position with respect to the apparatus main body with the display panel facing a rear side of the apparatus main body, the opening/closing detecting unit and the rotation detecting unit detect a positive magnetic field generated by the magnetic field generating unit; when the display unit is opened assuming that the closed position with respect to the apparatus main body corresponds to an opening/closing angle of 0°, the opening/closing detecting unit detects the magnetic field generated by the magnetic field generating unit in a range of the opening/closing angle from 0° to 90°, a detection result of the opening/closing detecting unit is switched so as not to detect the magnetic field generated by the magnetic field generating unit in a range of the opening/closing angle from 90° to 175°, and the rotation detecting unit detects the magnetic field generated by the magnetic field generating unit irrespective of the opening/closing angle; and when the display unit is rotated assuming that a state in which the display panel faces the rear side of the apparatus main body corresponds to a rotational angle of 0° in the range of the opening/closing angle from 90° to 175°, the opening/closing detecting unit does not detect the magnetic field generated by the magnetic field generating unit irrespective of the rotational angle, the rotation detecting unit does not detect the magnetic field generated by the magnetic field generating unit in a range of the rotational angle from −90° to 90°, and a detection result of the rotation detecting unit is switched so as to detect the magnetic field generated by the magnetic field generating unit in a range of the rotating angle from 90° to 180°.

According to the present invention, opening/closing of the display unit and rotation of the display unit are detected in a completely separate manner, and an image suitable for the opened/closed state and the rotated state of the display unit movable with respect to the apparatus main body is displayed on the display panel.

Further features of the present invention will become apparent from the following description of exemplary embodiments (with reference to the attached drawings).

DESCRIPTION OF THE EMBODIMENTS

The present invention will now be described with reference to the accompanying drawings showing an embodiment thereof.

Figure 1A:
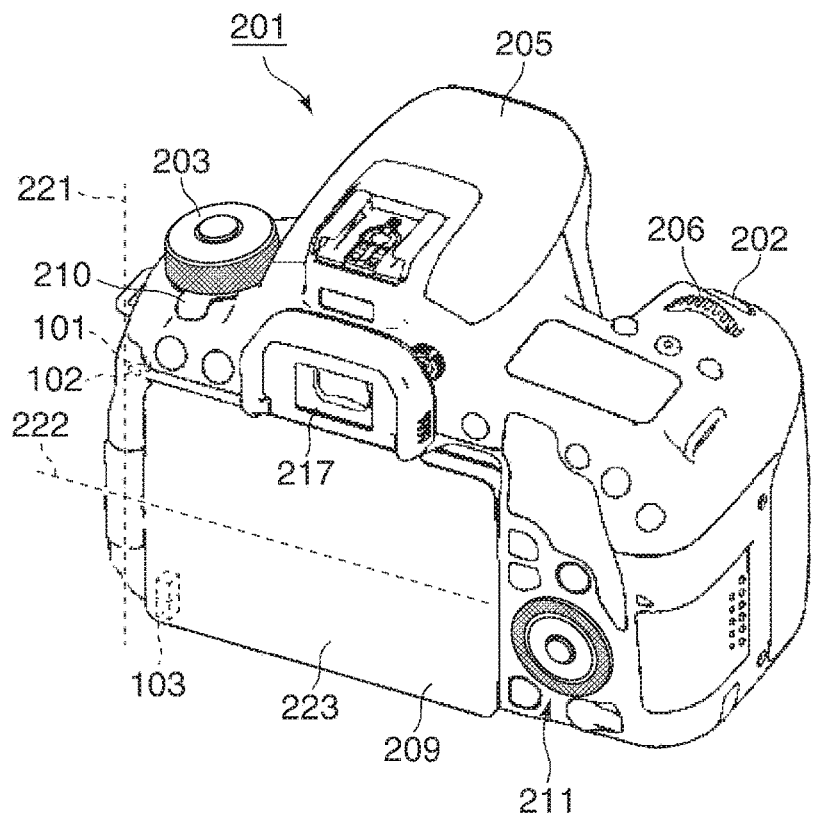
FIG. 1A is a perspective view showing a digital single-lens reflex camera, which is an example of an embodiment of an electronic apparatus according to the present invention, as seen from behind.
Figure 1B:
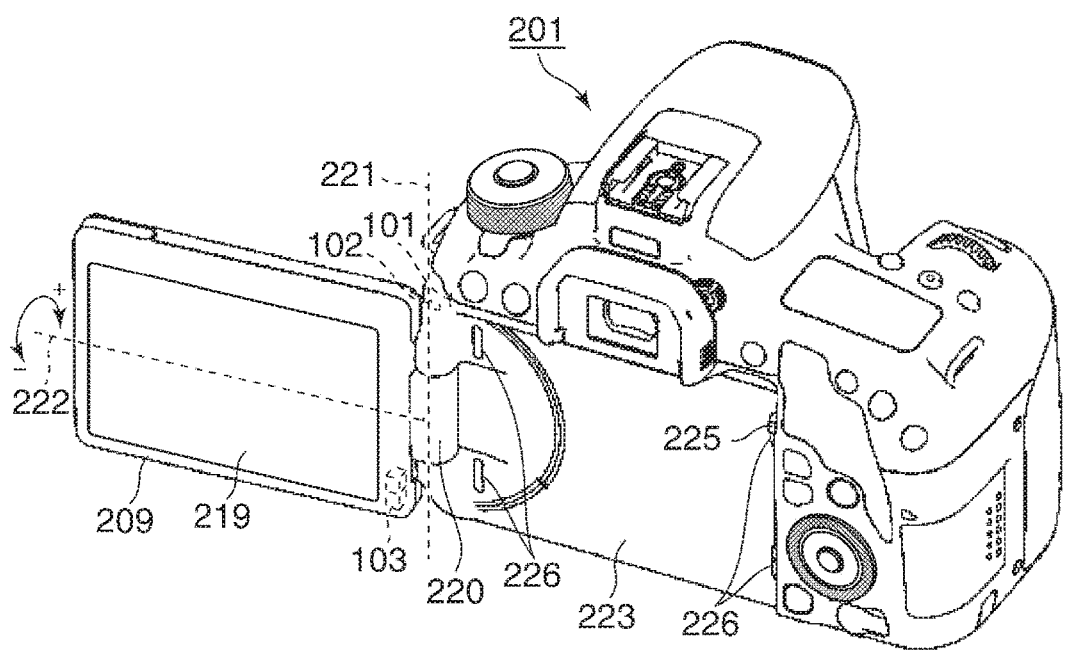
FIG. 1B is a perspective view showing the digital single-lens reflex camera appearing in FIG. 1A with its display unit opened.

FIG. 1A is a perspective view showing a digital single-lens reflex camera, which is an example of an embodiment of an electronic apparatus according to the present invention, as seen from behind. FIG. 1B is a perspective view showing the digital single-lens reflex camera appearing in FIG. 1A with its display unit opened. It should be noted that although in the present embodiment, the digital single-lens reflex camera, which is an example of an image pickup apparatus, is illustrated, the present invention is not limited to this.

The digital single-lens reflex camera (hereafter referred to as the camera) according to the present embodiment is constructed such that a lens unit, not shown, is removably mounted on a front side (subject side) of a camera main body 201 in a replaceable manner. A shutter release button 202, a mode selector switch 203, a power switch 210, a main electronic dial 206, a pop-up flash unit 205, and so forth are provided on an upper surface of the camera main body 201. The camera main body 201 corresponds to an example of an apparatus main body according to the present invention.

On a rear side of the camera main body 201, a display unit 209, which is comprised of an LCD or the like, is supported so as to be openable and closable about an opening/closing axis 221 of a biaxial hinge portion 220 between a closed position appearing in FIG. 1A and an opened position appearing in FIG. 1B with respect to the camera main body 201. The display unit 209 is supported in the opened position appearing in FIG. 1B rotatably about a rotational axis 222 of the biaxial hinge portion 220. The display unit 209 in the opened position appearing in FIG. 1B is positioned with a display panel 219, which is a display surface, facing toward the rear.

In the closed state of the display unit 209 appearing in FIG. 1A, the display unit 209 is housed in a housing concave portion 223, which is formed in a rear side of the camera main body 201, with its display panel 219 facing to the front (the subject). Elastic members 226 are provided on the housing surface of the housing concave portion 223, and the display unit 209 housed in the housing concave portion 223 is stopped in an engaged state by an engaging claw 225 while being urged in an opening direction by the elastic members 226.

A finder eyepiece 217 is provided above the display unit 209 in the closed state appearing in FIG. 1A, and a variety of operating members 211 comprised of buttons, a dial, and so forth are provided on the right of the display unit 209.

It is assumed here that in the present embodiment, the range of angles through which the display unit 209 rotates about the opening/closing axis 221 is 175°, and the range of angles through which the display unit 209 rotates about the rotational axis 222 is 180° in a + direction and 90° in a − direction. It is also assumed that in the closed state of the display unit 209 appearing in FIG. 1A, the angle through which the display unit 209 is opened and closed is 0°, and the rotational angle of the display unit 209 is 0°.

Figure 2A:
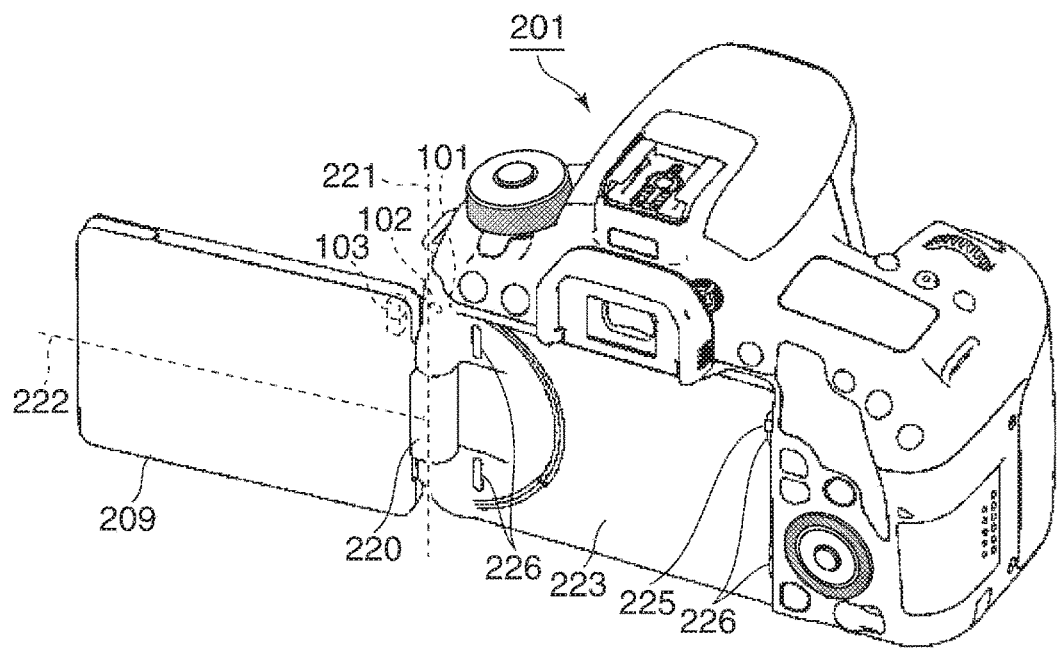
FIG. 2A is a perspective view showing a state in which the display unit in the opened state appearing in FIG. 1B has been rotated by 180°.
Figure 2B:
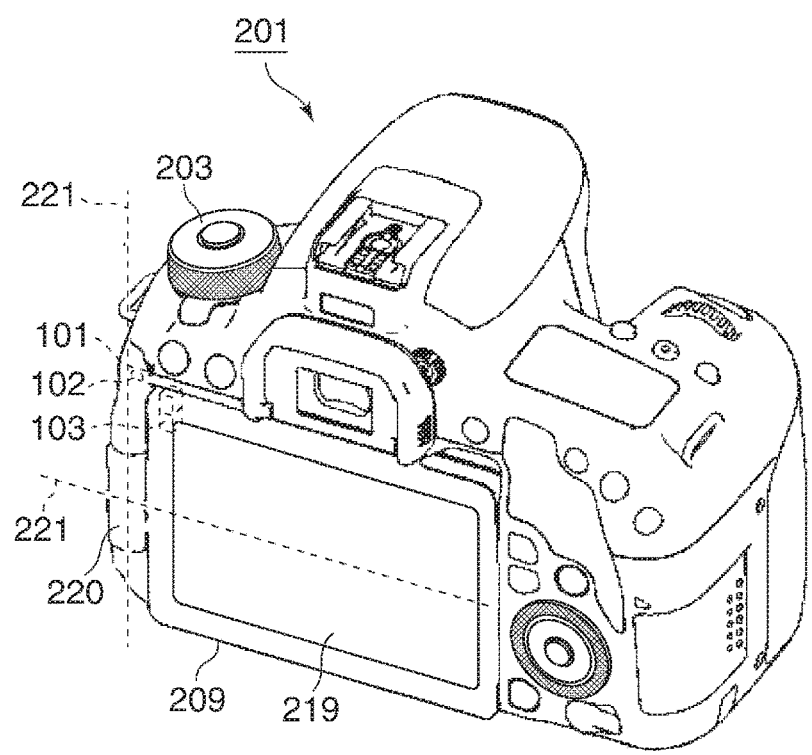
FIG. 2B is a perspective view showing a state in which the display unit appearing in FIG. 2A is closed.

FIG. 2A is a perspective view showing a state in which the display unit 209 in the opened state appearing in FIG. 1B has been rotated by 180° about the rotational axis 222, and FIG. 2B is a perspective view showing a state in which the display unit 209 appearing in FIG. 2A is closed.

In the opened state of the display unit 209 appearing in FIG. 1A, the display panel 219 of the display unit 209 faces the subject. In the closed state of the display unit 209 appearing in FIG. 2B, the display panel 219 is housed in the housing concave portion 223 with the display panel 219 facing the rear of the camera main body 201. As with FIG. 1A, the display panel 219 housed in the housing concave portion 223 is stopped in an engaged state by the engaging claw 225 while being urged in the opening direction by the elastic members 226. It is assumed that in this case, the angle through which the display unit 209 is opened and closed is 0°, and the rotational angle of the display unit 209 is +180°.

As shown in FIGS. 1A, 1B, 2A, and 2B, a magnetic sensor (hereafter referred to as the opening/closing sensor) 101 for detecting opening and closing of the display unit 209, and a magnetic sensor (hereafter referred to as the rotation sensor) 102 for detecting rotation of the display unit 209 are provided inside the camera main body 201. The opening/closing sensor 101 corresponds to an example of an opening/closing detecting unit according to the present invention, and the rotation sensor 102 corresponds to an example of a rotation detecting unit according to the present invention.

The opening/closing sensor 101 detects an opening/closing action of the display unit 209, and the rotation sensor 102 detects a rotating action of the display unit 209. Single-pole giant magneto resistive (GMR) elements are used as the opening/closing sensor 101 and the rotation sensor 102. It should be noted that double-pole GMR elements may be used as the opening/closing sensor 101 and the rotation sensor 102, but using the single-pole GMR elements enables cost reduction.

A magnet 103, which is an example of a magnetic field generating unit, is provided inside the display unit 209, and a magnetic field generated by the magnet 103 is detected by the opening/closing sensor 101 and the rotation sensor 102. In the state shown in FIG. 2B, both the opening/closing sensor 101 and the rotation sensor 102 are detecting the magnetic field generated by the magnet 103. In the present embodiment, an image displayed on the display panel 219 in the state shown in FIG. 2B is referred to as a "normal image". The "normal image" corresponds to an example of a third image according to the present invention. It should be noted that a relationship between the opening/closing and rotating actions of the display unit 209 and a magnetic flux density of the magnet 103 detected by the opening/closing sensor 101 and the rotation sensor 102 will be described later with reference to FIG. 8.

Figure 3A:
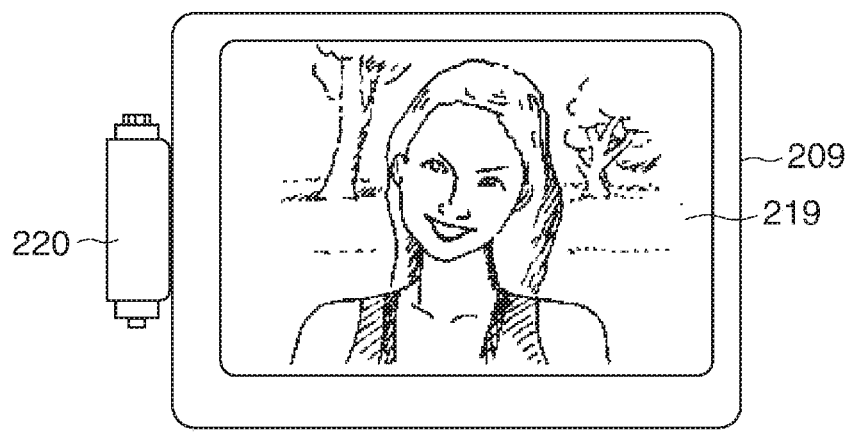
FIG. 3A is a view showing an example of a "normal image" displayed on a display panel.

FIG. 3A is an example of the "normal image" displayed on the display panel 219, and corresponds to the state of the display unit 209 in FIG. 2B, that is, the state in which the display unit 209 is housed in the housing concave portion 223 with the display panel 219 facing the rear of the camera main body 201. In this state, both the opening/closing sensor 101 and the rotation sensor 102 detect the magnetic field of the magnet 103.

Figure 3B:
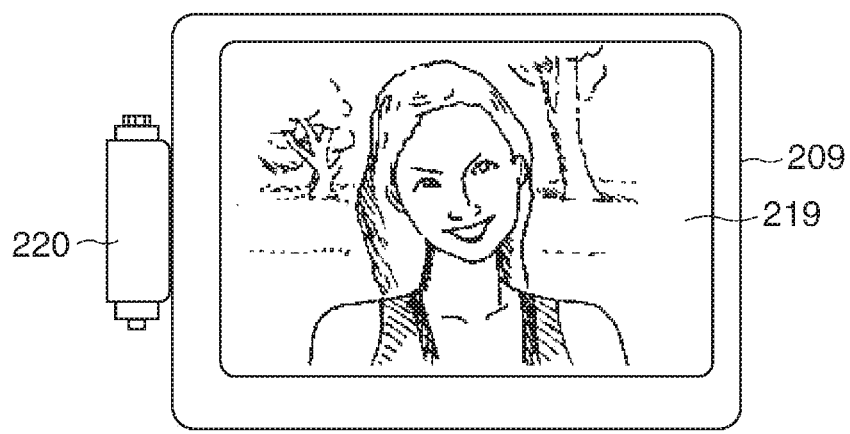
FIG. 3B is a view showing an example of a "horizontally inverted image" displayed on the display panel.

When the display unit 209 in FIG. 2B is opened to a predetermined angle from the state in FIG. 2B, only the rotation sensor 102 detects the magnetic field of the magnet 103. At this time, the display on the display panel 219 is controlled by a system control unit 401 (FIG. 4), to be described later, to switch from the "normal image" in FIG. 3B to a "horizontally inverted image" shown in FIG. 3B and obtained by horizontally inverting the "normal image". The "horizontally inverted image" is suitable for a case where a photographer takes a picture of himself or herself. The "horizontally inverted image" corresponds to an example of a first image according to the present invention.

By further rotating the display unit 209 about the opening/closing axis 221 by a predetermined angle or more in the opening direction, the user brings the display unit 209 into the state shown in FIG. 2A. In FIG. 2A, the display panel 219 faces the front of the camera main body 201 in the opened state of the display unit 209. In this case, the opening/closing angle of the display unit 209 is 175°, and the rotational angle of the display unit 209 is +180°. At this time, the opening/closing sensor 101 does not detect the magnetic field of the magnet 103.

Then, when the user rotates the display unit 209 in one direction about the rotational axis 222 so that the display panel 219 can face the rear of the camera main body 201, neither the opening/closing sensor 101 nor the rotation sensor 102 detects the magnetic field of the magnet 103. At this time, the display on the display panel 219 is controlled by the system control unit 401 to switch to an image obtained by vertically inverting the "horizontally inverted image" in FIG. 3B.

Figure 3C:
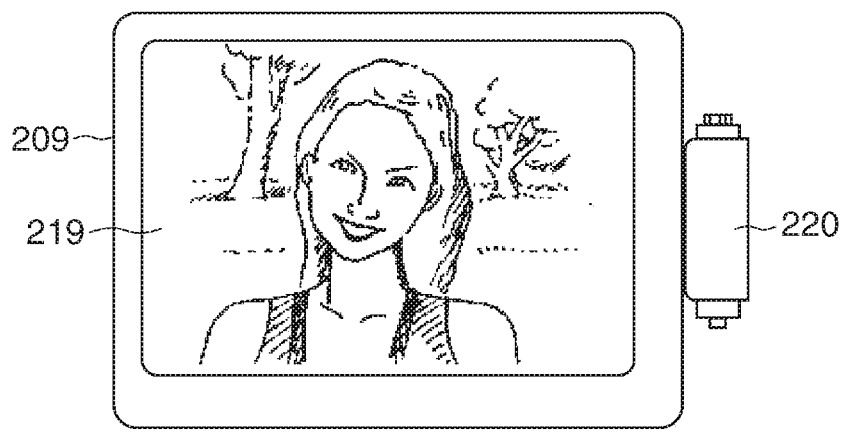
FIG. 3C is a view showing an example of a "vertically and horizontally inverted image" displayed on the display panel.

As a result, as shown in FIG. 3C, the display is switched to a "vertically and horizontally inverted image" obtained by vertically and horizontally inverting the "normal image" in FIG. 3A. The "vertically and horizontally inverted image" is suitable for a case where the photographer takes a picture with the display unit 209 opened. The "vertically and horizontally inverted image" corresponds to an example of a second image according to the present invention.

After that, when the user further rotates the display unit 209 in one direction about the rotational axis 222, the display unit 209 is brought into the state in FIG. 1B at the rotational angle of 0°. In the opened state of the display unit 209 in FIG. 1B, the display panel 219 faces the rear of the camera main body 201. In this case, the opening/closing angle of the display unit 209 is 175°, and the rotational angle of the display unit 209 is 0°.

Then, as the user closes the display unit 209 about the opening/closing axis 221 from the state in FIG. 1B, a closing sensor, not shown, detects the closed state of the display unit 209 at a predetermined angle, and the display panel 219 is turned off under the control of the system control unit 401. After that, as the user further rotates the display unit 209 in the closing direction about the opening/closing axis 221, the display unit 209 is brought into the state shown in FIG. 1A at the opening/closing angle of 0°.

In the closed state of the display unit 209 in FIG. 1A, the display panel 219 faces the front of the camera main body 201. In this case, the opening/closing angle of the display unit 209 is 0°, and the rotational angle of the display unit 209 is 0°. In this state, the display unit 209 is housed in the housing concave portion 223 with the display panel 219 opposed to the housing surface of the housing concave portion 223. As the user opens the display unit 209 about the opening/closing axis 221 from the state in FIG. 1A, the closing sensor output turns off when the display unit 209 reaches a predetermined angle, and the display panel 219 is caused to light up under the control of the system control unit 401.

Figure 4:
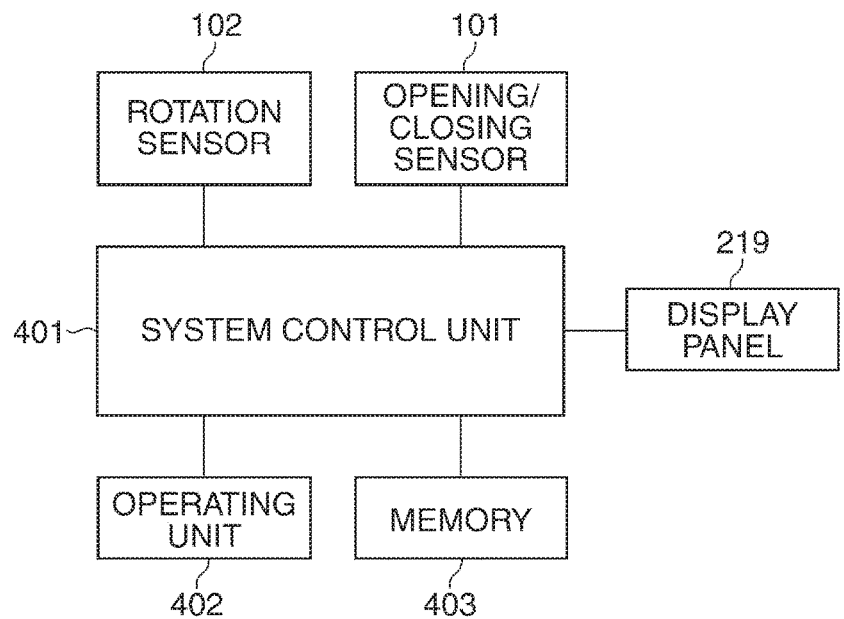
FIG. 4 is a block diagram schematically showing a control system of a camera main body.

FIG. 4 is a block diagram schematically showing a control system of the camera main body 201. Referring to FIG. 4, the system control unit 401 is responsible for exercising control over the entire camera such as control over image display on the display panel 210 and image pickup operations. An operating unit 402 includes the shutter release button 202, the main electronic dial 206, the variety of operating members 211, and so forth, and acts as a receiving unit that receives operations from the user.

Control programs, a variety of data, and so forth to be used by the system control unit 401 are stored in the memory 403. The opening/closing sensor 101 and the rotation sensor 102 output their respective detection signals to the system control unit 401. The system control unit 401 obtains on or off detection signals output from the opening/closing sensor 101 and the rotation sensor 102 and controls display on the display panel 219.

Here, Table 2 shows a relationship between results of detection by the opening/closing sensor 101 and the rotation sensor 102 and modes of display on the display panel 219.

TABLE 2

| Modes of display on the display panel | Normal image FIG. 2B | Horizontally inverted image FIG. 2A | Vertically and horizontally inverted image FIG. 1B | Turn-off FIG. 1A |
|---|---|---|---|---|
| Detection by the opening/closing sensor | ON | OFF | OFF | OFF |
| Detection by the rotation sensor | ON | ON | OFF | OFF |

As described earlier, the system control unit 401 controls display on the display panel 219 based on the relationship in Table 2 between results of detection by the opening/closing sensor 101 and the rotation sensor 102 and modes of display on the display panel 219.

Figure 5:
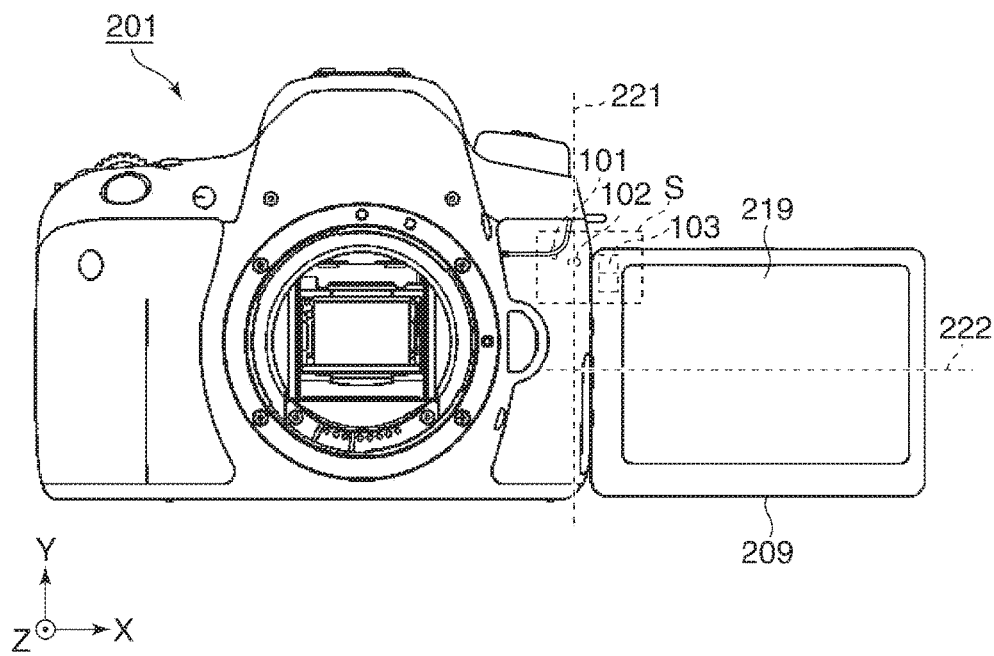
FIG. 5 is a view showing the state appearing in FIG. 2A as seen from the front of the camera main body.

Next, referring to FIGS. 5 to 7, a description will be given of how the opening/closing sensor 101, the rotation sensor 102, and the magnet 103 are arranged. FIG. 5 is a view showing the state appearing in FIG. 2A as seen from the front of the camera main body 201.

Referring to FIG. 5, assuming that a Z direction is a direction of an optical axis of the camera main body 201, a longitudinal direction of the rectangular display panel 219 which is perpendicular to the Z direction is an X direction, and a height direction of the camera main body 201 which is perpendicular to the X direction and also perpendicular to the Z direction is a Y direction. As shown in FIG. 5, the magnet 103 is placed at an end of the display unit 209 and above the rotational axis 222 and on the biaxial hinge portion 220 side. Also, the magnet 103 is placed so as to be magnetized in the Y direction where a +Y direction (upper side) is an S pole and a −Y direction (lower side) is an N pole.

The opening/closing sensor 101 and the rotation sensor 102 are placed on an upper side of the biaxial hinge portion 220 and at substantially the same distance from the rotational axis 222 in an axial direction of the opening/closing axis 221 as the magnet 103. In this case, the magnet 103 is placed close to the opening/closing axis 221 in the X direction of the display unit 209, and hence, in an opening/closing action of the display unit 209, the magnetic flux density of the magnet 103 in the opening/closing sensor 101 varies to a relatively large degree. Namely, the opening/closing sensor 101 is placed at such a location as to detect the magnetic field from the magnet 103 with increased sensitivity.

Moreover, the magnet 103 is located farthest from the rotational axis 222 in the Y direction of the display unit 209, and in a rotating action of the display unit 209, the magnetic flux density of the magnet 103 in the opening/closing sensor 101 varies to the largest degree. Namely, the rotation sensor 102 is placed at such a location as to detect the magnetic field from the magnet 103 with increased sensitivity.

Figure 6A:
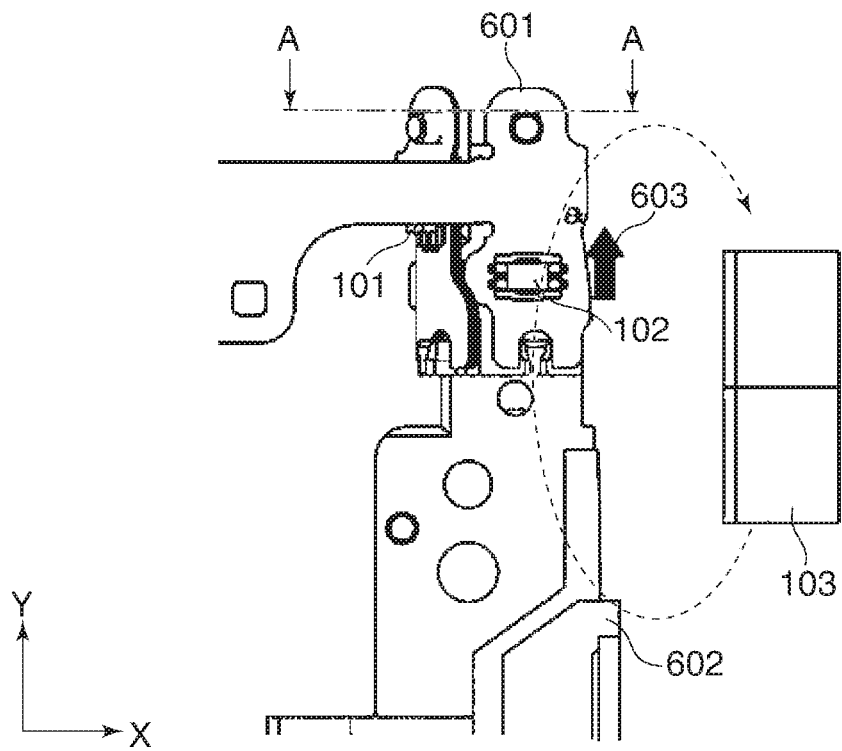
FIG. 6A is an enlarged view showing in detail an area S of FIG. 5.
Figure 6B:
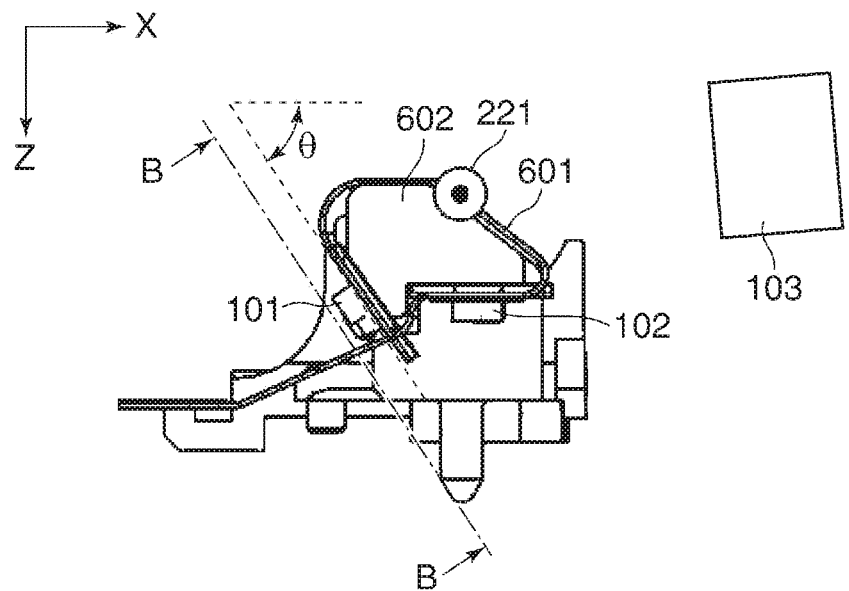
FIG. 6B is a cross-sectional view taken along line A-A of FIG. 6A.
Figure 7:
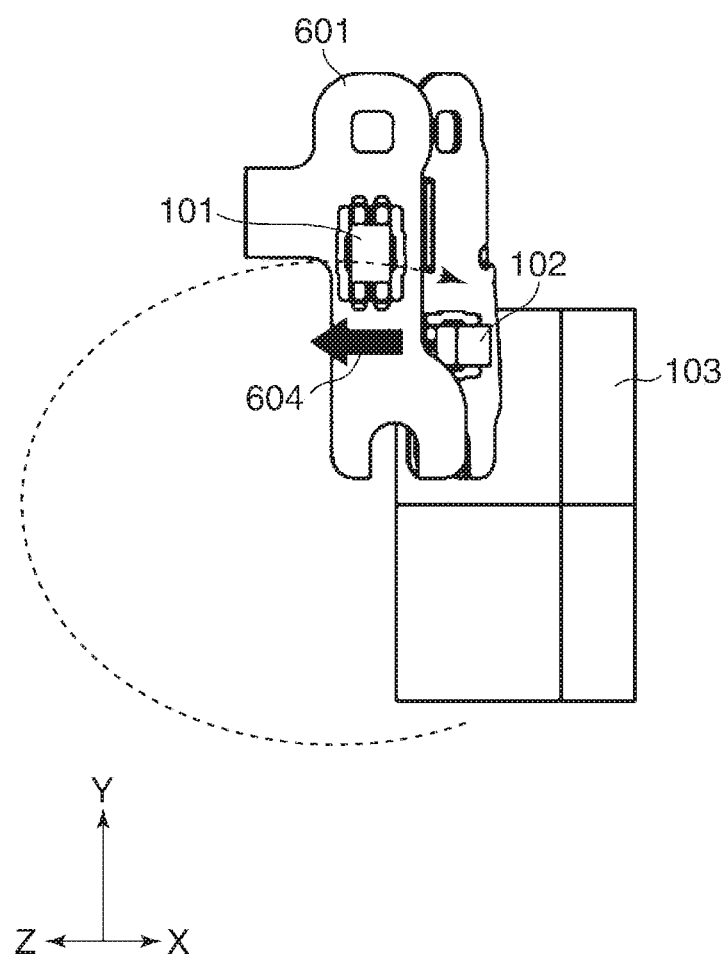
FIG. 7 is a fragmentary view taken along line B-B of FIG. 6B.

Referring to FIGS. 6A, 6B, and 7, a detailed description will be given of how the opening/closing sensor 101 and the rotation sensor 102 are arranged. FIG. 6A is an enlarged view showing in detail an area S of FIG. 5. It is assumed that in FIG. 6A, a horizontal direction is an X direction, a vertical direction is a Y direction, and a +Y direction (upward direction) is a positive direction. As shown in FIG. 6A, the rotation sensor 102 is mounted on an FPC (flexible printed circuit) 601, and the rotation sensor 102 has a mounting surfaces parallel to an XY plane.

The FPC 601 is fixed to a resin member 602 by a double-faced tape (not shown) or the like. An arrow 603 indicates a direction in which the rotation sensor 102 detects a magnetic field, and the rotation sensor 102 is able to detect a magnetic field parallel to the mounting surface of the rotation sensor 102. Namely, the rotation sensor 102 is placed so as to detect a magnetic-field component in the same direction as that of a magnetic field from the magnet 103 which is indicated by a broken-line arrow in FIG. 6A.

FIG. 6B is a cross-sectional view taken along line A-A of FIG. 6A. In FIG. 6B, a horizontal direction is an X direction, and a vertical direction is a Z direction. As shown in FIG. 6B, the opening/closing sensor 101 is mounted on the FPC 601 as with the rotation sensor 102. In an XZ plane, the opening/closing sensor 101 and the rotation sensor 102 are placed on an inner side of the camera main body 201 than the opening/closing axis 221. This makes it possible to detect an opened or closed state/rotated state of the display unit 209 at a desired opening or closing angle/rotational angle and downsize the camera main body 201.

A mounting surface of the opening/closing sensor 101 is tilted at an angle θ with respect to the XY plane. The angle θ is formed by the mounting surface and an attaching surface of the opening/closing sensor 101 with the XY plane. By changing the angle θ, the opening/closing angle of the display unit 209 at which the detection signal from the opening/closing sensor 101 is on is changeable.

For example, the angle θ should be changed to a greater value when the angle of detection is desired to be changed to a greater opening/closing angle than an angle of about 100° at which the display unit 209 is opened/closed and the detection signal from the opening/closing sensor 101 is on as will be described later with reference to FIG. 9. In this case, a direction in which the opening/closing sensor 101 detects the magnetic field is changed within the XZ plane without changing a detection center position of the opening/closing sensor 101.

FIG. 7 is a fragmentary view taken along line B-B of FIG. 6B. It should be noted that in FIG. 7, the resin member 602 is omitted so as to clearly show a positional relationship between the opening/closing sensor 101 and the magnet 103. In FIG. 7, an arrow 604 indicates a magnetic field detecting direction of the opening/closing sensor 101, and the opening/closing sensor 101 is able to detect a magnetic field in a direction parallel to the mounting surface of the opening/closing sensor 101, where a +Z direction is a positive direction. Namely, the opening/closing sensor 101 is placed so as to be able to detect a magnetic-field component in a direction opposite to the direction of the magnetic field from the magnet 103, which is indicated by a broken-line arrow in FIG. 7. An effect achieved by making the magnetic field detecting direction of the opening/closing sensor 101 opposite to the direction of the magnetic field from the magnet 103 will be described later with reference to FIG. 8B.

Figure 8A:
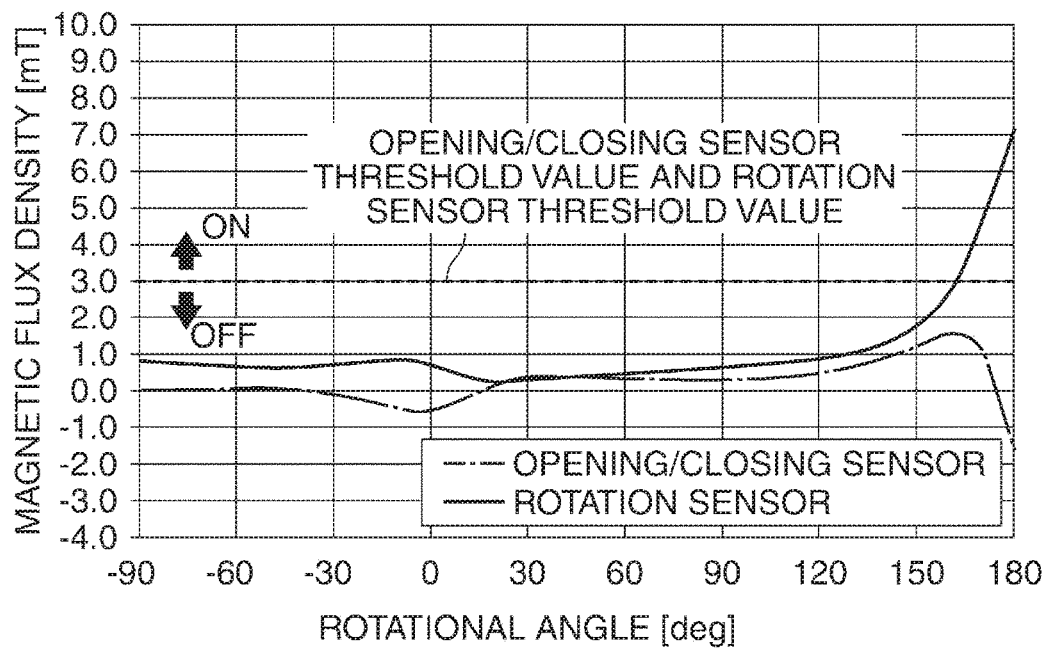
FIGS. 8A and 8B are graphs showing how magnetic flux densities detected by an opening/closing sensor and a rotation sensor vary as the display unit is rotated.

Next, referring to FIGS. 8A, 8B, and 9, a description will be given of a relationship between opening and closing/rotating actions of the display unit 209 and magnetic flux densities detected by the opening/closing sensor 101 and the rotation sensor 102. FIG. 8A is a graph showing how magnetic flux densities detected by the opening/closing sensor 101 and the rotation sensor 102 vary as the display unit 209 is rotated from the state in FIG. 1B to the state in FIG. 2A. In FIG. 8A, the horizontal axis indicates rotational angles (unit: degree) of the display unit 209, and the vertical axis indicates magnetic flux densities (unit: mT) detected by the opening/closing sensor 101 and the rotation sensor 102.

As the display unit 209 in FIG. 8A rotates from the state in FIG. 1B to the state in FIG. 2A, the opening/closing angle is fixed at 175° while the rotational angle changes from 0° to +180°. Threshold values (a magnetic flux density of 3.0 [mT]) for the opening/closing sensor 101 and the rotation sensor 102 indicated by broken lines in FIG. 8A are equal. Each sensor is turned on when it detects a magnetic flux density greater than the threshold value, and turned off when it detects a magnetic flux density equal to or smaller than the threshold value. As described earlier, the "vertically and horizontally inverted image" appearing in FIG. 3C is displayed on the display panel 219 of the display unit 209 in FIG. 1B.

Referring to FIG. 8A, during a rotating action of the display unit 209, the magnetic flux density of the magnet 103 becomes greater than the threshold value for the rotation sensor 102 when the rotational angle is about 160°, and the rotation sensor 102 outputs an on signal. When the display unit 209 is rotated in an opposite direction, the magnetic flux density of the magnet 103 becomes smaller than the threshold value for the rotation sensor 102 when the rotational angle is about 160°, and the rotation sensor 102 outputs an off signal.

On the other hand, the magnetic flux density of the magnet 103 detected by the opening/closing sensor 101 is always smaller than the threshold value, and hence the opening/closing sensor 101 always outputs an off signal. The reason for this is that the magnet 103 and the opening/closing sensor 101 are placed at such locations that the direction of the magnetic field generated by the magnet 103 and the magnetic field detecting direction of the opening/closing sensor 101 are not changed by a rotating action of the display unit 209.

Now, referring to FIG. 8B, a description will be given of effects achieved by making the magnetic field detecting direction of the opening/closing sensor 101 opposite to the direction of the magnetic field generated by the magnet 103. FIG. 8B is a graph showing variations in magnetic flux densities detected by the opening/closing sensor 101 and the rotation sensor 102 when the display unit 209 is rotating in a case where the magnetic field detecting direction of the opening/closing sensor 101 is the same as the direction of the magnetic field generated by the magnet 103.

When the opening/closing sensor 101 is placed at a position inverted by 180° with a detecting position at a center so that the magnetic field detecting direction of the opening/closing sensor 101 and the direction of the magnetic field generated by the magnet 103 can be the same, not opposite to each other, the polarity of the magnetic flux density detected by the opening/closing sensor 101 is apparently reversed. Namely, the graph of FIG. 8B showing the variations in magnetic flux densities detected by the opening/closing sensor 101 is obtained by vertically inverting the variations in magnetic flux densities detected by the opening/closing sensor 101 in FIG. 8A with a magnetic flux density of 0 [mT] at a center.

Figure 8B:
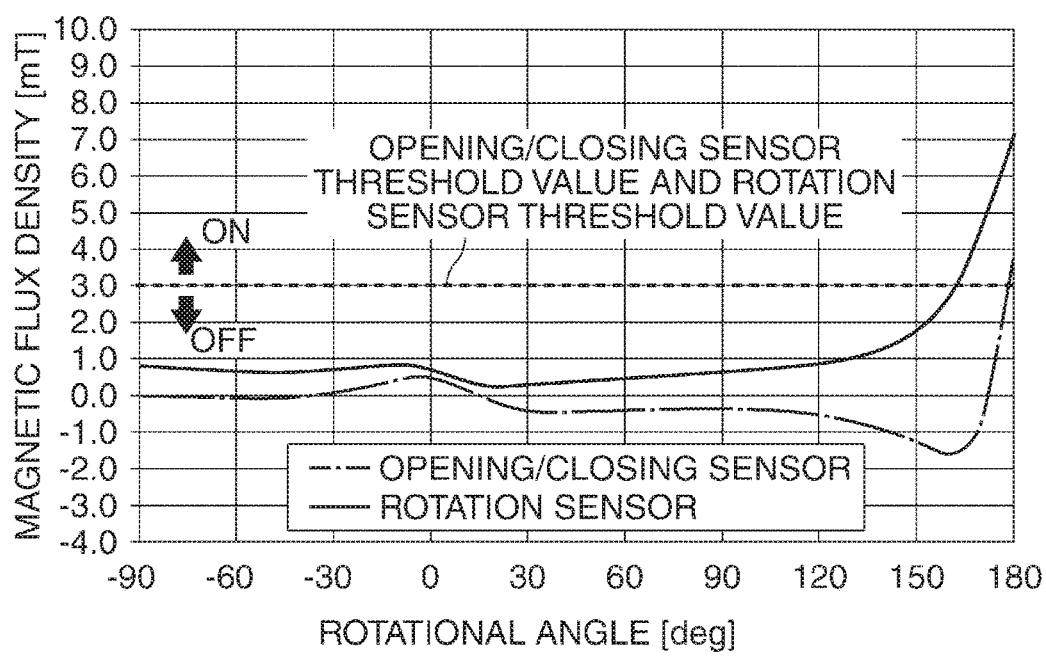

Referring to FIG. 8B, "the opening/closing sensor 101 and the rotation sensor 102 are off" when the rotational angle of the display unit 209 is between 0° and 160°, "only the rotation sensor 102 is on" when the rotational angle of the display unit 209 is about 160°, and "the opening/closing sensor 101 and the rotation sensor 102 are on" when the rotational angle of the display unit 209 is about 170°. Referring to Table 2, when the display unit 209 is rotated from 0° to 180° in the opened state, images on the display panel 219 are switched in the following order, the vertically and horizontally inverted image→the horizontally inverted image→the normal image.

Figure 10:
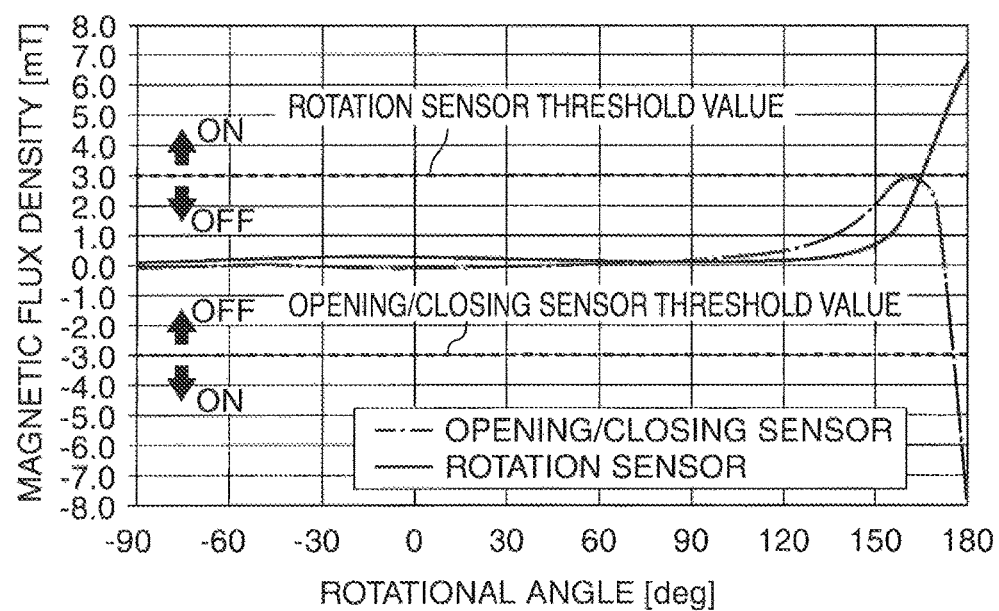
FIG. 10 is a graph showing a relationship between rotating actions of a display unit and magnetic flux densities detected by an opening/closing sensor and a rotation sensor according to a prior art.

This is the same as the order in which images displayed on the display panel 219 in FIG. 10 described in Japanese Laid-Open Patent Publication (Kokai) No. 2016-138950 mentioned above are switched, and referring to FIG. 8B, as with the display panel described in Japanese Laid-Open Patent Publication (Kokai) No. 2016-138950, the "horizontally inverted image" which does not correspond to a rotating state of the display unit 209 is displayed on the display panel 219 while the display unit 209 is rotating. Thus, when the magnetic field detecting direction of the opening/closing sensor 101 is the same as the direction of the magnetic field generated by the magnet 103, an image corresponding to a rotating state of the display unit 209 cannot be displayed on the display panel 219.

Therefore, in the present embodiment, the magnetic field detecting direction of the opening/closing sensor 101 is opposite to the direction of the magnetic field generated by the magnet 103. As a result, in a rotating action of the display unit 209 in the opened state, there are two results of detection by the opening/closing sensor 101 and the rotation sensor 102, i.e. "the opening/closing sensor 101 and the rotation sensor 102 are off" and "only the rotation sensor 102 is on" as described above with reference to FIG. 8A and Table 2.

Referring now to Table 2, the system control unit 401 is able to obtain the detection result "the opening/closing sensor 101 and the rotation sensor 102 are off", causing the "vertically and horizontally inverted image" to be displayed on the display panel 219. The system control unit 401 is also able to obtain the detection result "only the rotation sensor 102 is on", causing the "horizontally inverted image" to be displayed on the display panel 219. As a result, in a rotating action of the display unit 209, the "vertically and horizontally inverted image" in FIG. 1B is switched to the "horizontally inverted image" in FIG. 2A without the "normal image" in FIG. 2B being displayed before the "horizontally inverted image" is displayed.

Figure 9:
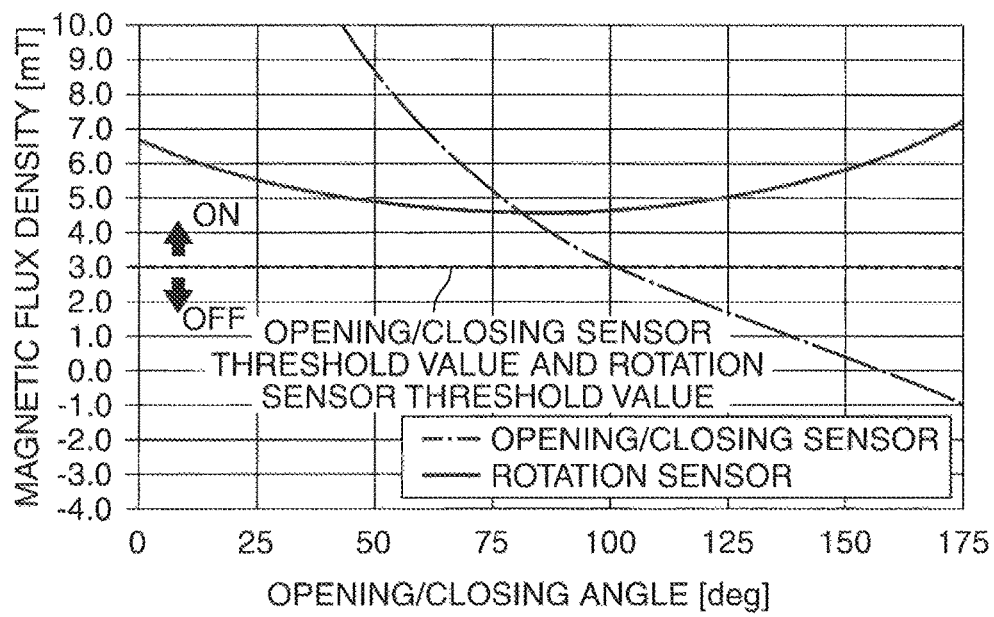
FIG. 9 is a graph showing how magnetic flux densities detected by the opening/closing sensor and the rotation sensor vary as the display unit 209 is opened and closed.

FIG. 9 is a graph showing variations in magnetic flux densities detected by the opening/closing sensor 101 and the rotation sensor 102 when the display unit 209 is opened from the state in FIG. 2B to the state in FIG. 2A. In an opening action of the display unit 209, the rotational angle is fixed at +180° while the opening/closing angle varies from 0° to 175°. In FIG. 9, the horizontal axis indicates the opening/closing angle (unit: degree) of the display unit 209, and the vertical axis indicates magnetic flux densities (unit: mT) detected by the opening/closing sensor 101.

As shown in FIG. 9, in an opening action of the display unit 209, when the opening/closing angle is about 100°, the magnetic flux density of the magnet 103 becomes smaller than the threshold value for the opening/closing sensor 101, and hence the opening/closing sensor 101 outputs an off signal. In a case where the display unit 209 is closed, the magnetic flux density of the magnet 103 becomes greater than the threshold value for the opening/closing sensor 101 when the opening/closing angle is about 100°, and the opening/closing sensor 101 outputs an on signal in an opening/closing action of the display unit 209.

On the other hand, the magnetic flux density of the magnet 103 detected by the rotation sensor 102 is always greater than the threshold value, and hence the rotation sensor 102 always outputs an on signal. The reason for this is that the magnet 103 and the rotation sensor 102 are arranged at such locations that the relationship between the magnetizing direction of the magnet 103 and the magnetic field detecting direction of the rotation sensor 102 is not changed by an opening/closing action of the display unit 209.

It should be noted that when the display unit 209 is closed from the state in FIG. 1B to the state in FIG. 1A, the magnet 103 is satisfactorily away from the opening/closing sensor 101 and the rotation sensor 102, and hence the opening/closing sensor 101 and the rotation sensor 102 do not detect magnetic flux densities greater than the threshold values.

Moreover, when the display unit 209 is closed from the state in FIG. 2A to the state in FIG. 2B, there are two results of detection by the opening/closing sensor 101 and the rotation sensor 102, i.e. "the opening/closing sensor 101 and the rotation sensor 102 are on" and "only the rotation sensor 102 is on". Referring to Table 2, the system control unit 401 is able to obtain the detection result "the opening/closing sensor 101 and the rotation sensor 102 are on", causing the "normal image" on the display panel 219 to be displayed on the display panel 219 in the closed state (FIG. 2B).

As described above, in the present embodiment, the magnet 103 and the rotation sensor 102 are arranged at such locations that the relationship between the magnetizing direction of the magnet 103 and the magnetic field detecting direction of the rotation sensor 102 is not changed by an opening/closing action of the display unit 209. Moreover, the magnet 103 and the opening/closing sensor 101 are arranged at such locations that the relationship between the magnetizing direction of the magnet 103 and the magnetic field detecting direction of the opening/closing sensor 101 is not changed by a rotating action of the display unit 209. This makes it possible to detect opening/closing of the display unit 209 and rotation of the display unit 209 in a completely separate manner, and display, on the display panel 219, an image suitable for an opened/closed state and rotated state of the display unit 209 with respect to the camera main body 201.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-008580, filed Jan. 20, 2017, which is hereby incorporated by reference herein in its entirety.

What is claimed is:

1. An electronic apparatus in which a display unit is able to open and close with respect to an apparatus main body via an opening/closing axis and is supported in a manner being rotatable about a rotational axis in an opened state, comprising;

a magnetic field generating unit; and at least one processor or circuit configured to perform the operation of the following units:

an opening/closing detecting unit configured to be used to detect opening and closing of the display unit;

a rotation detecting unit configured to detect rotation of the display unit; and a control unit configured to control display on a display panel of the display unit based on results of detection of a magnetic field, which is generated by the magnetic field generating unit, by the opening/closing detecting unit and the rotation detecting unit, wherein the opening/closing detecting unit, the rotation detecting unit, and the magnetic field generating unit are arranged so that:

when the display unit is opened, assuming that the closed position with respect to the apparatus main body corresponds to an opening/closing angle of 0°, the opening/closing detecting unit detects the magnetic field generated by the magnetic field generating unit in a range of the opening/closing angle from 0° to 90°, the opening/closing detecting unit does not detect the magnetic field generated by the magnetic field generating unit in a range of the opening/closing angle from 90° to 175°, and the rotation detecting unit detects the magnetic field generated by the magnetic field generating unit irrespective of the opening/closing angle; and when the display unit is rotated, assuming that a state in which the display panel faces the rear side of the apparatus main body corresponds to a rotational angle of 0° in the range of the opening/closing angle from 90° to 175°, the opening/closing detecting unit does not detect the magnetic field generated by the magnetic field generating unit irrespective of the rotational angle, the rotation detecting unit does not detect the magnetic field generated by the magnetic field generating unit in a range of the rotational angle from −90° to 90°, and the rotation detecting unit detects the magnetic field generated by the magnetic field generating unit in a range of the rotating angle from 90° to 180°.

2. The electronic apparatus according to claim 1, wherein when only the rotation detecting unit detects the magnetic field generated by the magnetic field generating unit, the control unit displays, on the display panel, a first image suitable for a state where the display panel faces a front side of the apparatus main body with the display unit opened, and when the opening/closing detecting unit and the rotation detecting unit do not detect the magnetic field generated by the magnetic field generating unit, the control unit displays, on the display panel, a second image suitable for a state where the display panel faces the rear side of the apparatus main body with the display unit opened.

3. The electronic apparatus according to claim 1, wherein the opening/closing detecting unit and the rotation detecting unit detect the magnetic field when magnetic flux densities of the magnetic field generating unit exceed the same magnetic flux density threshold value.

4. The electronic apparatus according to claim 1, wherein the magnetic field generating unit is provided in the display unit, and the opening/closing detecting unit and the rotation detecting unit are provided in the apparatus main body.

5. The electronic apparatus according to claim 4, wherein the opening/closing detecting unit and the rotation detecting unit are arranged at substantially the same distance from the rotational axis in a direction of the opening/closing axis as the magnetic field generating unit and are arranged on an inner side of the apparatus main body than the opening/closing axis.

6. The electronic apparatus according to claim 1, wherein the magnetic field generating unit has a magnetizing direction parallel to the opening/closing axis with an S pole lying on an upper side of the apparatus main body when the display panel faces a front side of the apparatus main body with the display unit opened,
the rotation detecting unit is placed so that a magnetic field detecting direction of the rotation detecting unit and a direction of the magnetic field generated by the magnetic field generating unit are the same, and
the opening/closing detecting unit is placed so that a magnetic field detecting direction of the opening/closing detecting unit and the direction of the magnetic field generated by the magnetic field generating unit are opposite to each other.

7. The electronic apparatus according to claim 1, wherein when the opening/closing detecting unit and the rotation detecting unit detect the magnetic field generated by the magnetic field generating unit, the control unit displays, on the display panel, a third image suitable for a state where the display panel faces the rear side of the apparatus main body with the display unit closed with respect to the apparatus main body.

8. The electronic apparatus according to claim 1, wherein the opening/closing detecting unit and the rotation detecting unit are single-pole magnetic sensors.

* * * * *